United States Patent
Walters, Jr.

(10) Patent No.: US 7,857,331 B2
(45) Date of Patent: Dec. 28, 2010

(54) MECHANICALLY-DRIVEN FLIP AXLE ASSEMBLY AND METHOD OF MAKING

(75) Inventor: Jeffrey A. Walters, Jr., Bradenton, FL (US)

(73) Assignee: Globe Trailer Manufacturing, Inc., Bradenton, FL (US)

( * ) Notice: Subject to any disclaimer, the term of this patent is extended or adjusted under 35 U.S.C. 154(b) by 170 days.

(21) Appl. No.: 12/200,287

(22) Filed: Aug. 28, 2008

(65) Prior Publication Data
US 2010/0052279 A1    Mar. 4, 2010

(51) Int. Cl.
*B62D 61/12* (2006.01)
(52) U.S. Cl. .......................... 280/86.5; 180/209
(58) Field of Classification Search ............... 280/86.5, 280/43, 43.17, 401, 402; 414/436; 180/209
See application file for complete search history.

(56) References Cited

U.S. PATENT DOCUMENTS

| | | | | |
|---|---|---|---|---|
| 3,895,818 A * | 7/1975 | Fearon | ................ | 280/81.1 |
| 3,910,601 A * | 10/1975 | Michaud | ................ | 280/415.1 |
| 3,931,987 A | 1/1976 | Holliday | | |
| 3,977,691 A * | 8/1976 | Robertson | ................ | 280/81.1 |
| 4,423,884 A | 1/1984 | Gevers | | |
| 5,029,895 A * | 7/1991 | Anderson | ................ | 280/764.1 |
| 5,110,149 A * | 5/1992 | Dahlstrom | ................ | 280/401 |
| 5,242,185 A * | 9/1993 | Carr et al. | ................ | 280/423.1 |
| 6,050,578 A * | 4/2000 | Beck | ................ | 280/86.5 |
| 6,247,712 B1 | 6/2001 | Smith et al. | | |
| 6,315,311 B1 * | 11/2001 | Mathiowetz | ................ | 280/86.5 |
| 6,416,069 B1 | 7/2002 | Ramsey | | |
| 6,471,223 B1 | 10/2002 | Richardson | | |
| 6,796,566 B2 | 9/2004 | VanDenberg | | |
| 7,207,587 B1 * | 4/2007 | Wall | ................ | 280/425.2 |
| 2004/0123529 A1 * | 7/2004 | Wiese et al. | ................ | 52/6 |

* cited by examiner

*Primary Examiner*—Paul N Dickson
*Assistant Examiner*—Joseph Rocca
(74) *Attorney, Agent, or Firm*—Roger D. Emerson; Emerson Thomson Bennett

(57) ABSTRACT

A trailer assembly includes a trailer frame that supports a load to be carried. One or more axles have laterally-spaced wheels and are affixed to the trailer frame. A flip axle assembly is provided including one or more axles having laterally-spaced wheels. The flip axle assembly is hingeably mounted to the trailer frame, so as to be rotated from engagement with a road surface and onto the trailer frame. A drive system is provided that rotates the flip axle assembly between the trailer frame and engagement with the road surface.

22 Claims, 5 Drawing Sheets

MECHANICALLY-DRIVEN FLIP AXLE ASSEMBLY AND METHOD OF MAKING

I. BACKGROUND OF THE INVENTION

A. Field of Invention

This invention generally relates to the field of trailer assemblies, particularly those of the type conventionally towed by three-axle semi-tractors. Specifically, the invention relates to trailer assemblies that incorporate a flip axle assembly.

B. Description of the Related Art

Tractor-trailer rigs are commonly used in shipping to transport items between points of distribution. Certain types of flatbed trailers (e.g. "lowboy trailers") are used for hauling heavy equipment such as bulldozers and the like. Such trailer assemblies are very long and include a plurality of rear axles to support and distribute the weight of the heavy equipment.

The length of these trailer assemblies can be problematic when they are being loaded onto a ship or a cargo plane. Also, such trailers exceed the length requirements of certain states. To provide a trailer of variable length, a "flip axle" assembly is commonly employed in which one or more of the rear axles are mounted to an assembly that is hinged to the main trailer, so as to be flipped 180 degrees, between an operative position where the rear wheels contact the road and a stowage position where the entire flip axle assembly lays upon the rear deck of the trailer. A flip axle assembly is flipped back and forth using a forklift. However, a forklift is not always available, and this procedure can be hazardous and can result in damage to the trailer or forklift.

In order to overcome these difficulties, methods and apparatuses would be needed that would simplify the raising and lowering of a flip axle assembly. Methods and apparatuses would be needed that would not require the additional equipment and personnel associated with a forklift and would improve safety and care of the equipment.

II. SUMMARY OF THE INVENTION

Some embodiments of the present invention relate to a trailer assembly including a trailer frame that supports a load to be carried. One or more axles are provided having laterally-spaced wheels and affixed to the trailer frame. A flip axle assembly includes one or more axles having laterally-spaced wheels. The flip axle assembly is hingeably mounted to the trailer frame, so as to be rotated from engagement with a road surface and onto the trailer frame. A drive system is provided that rotates the flip axle assembly between the trailer frame and engagement with the road surface.

Other embodiments of the invention relate to a trailer assembly including a trailer frame that supports a load to be carried. One or more axles having laterally-spaced wheels are affixed to the trailer frame. A flip axle assembly is provided including at least one axle having laterally-spaced wheels. The flip axle assembly is hingeably mounted to the trailer frame, so as to be rotated from engagement with a road surface onto the trailer frame. A drive system rotates the flip axle assembly between the trailer frame and engagement with the road surface. The drive system includes an hydraulic piston that applies a displacing force. A linkage member is pivotally mounted between an operative end of the hydraulic piston and the flip axle assembly to transmit the displacing force from the hydraulic piston, so as to rotate the flip axle assembly.

Still other embodiments of the invention relate to a method of constructing a trailer assembly having a motorized flip axle assembly. A trailer frame is provided having one or more axles that support laterally-spaced wheels and affixed to the trailer frame. A flip axle assembly is provided, hingeably mounted to the trailer frame, so as to be rotated from engagement with a road surface onto the trailer frame. The flip axle assembly has one or more axles that support laterally-spaced wheels. A drive system is affixed to the trailer frame, so that the drive system rotates the flip axle assembly between the trailer frame and engagement with the road surface.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

Figure 3A:
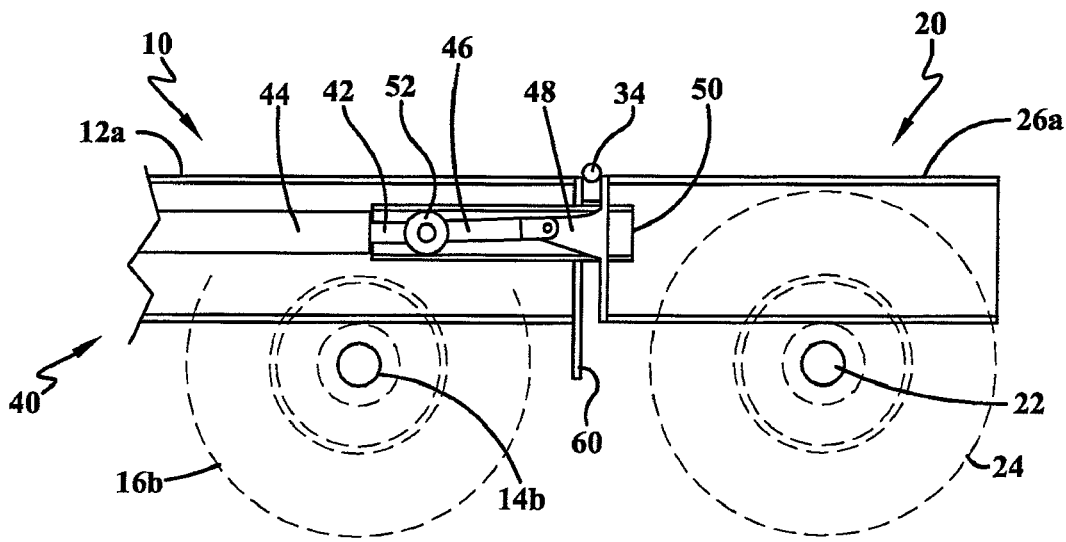
Figure 3B:
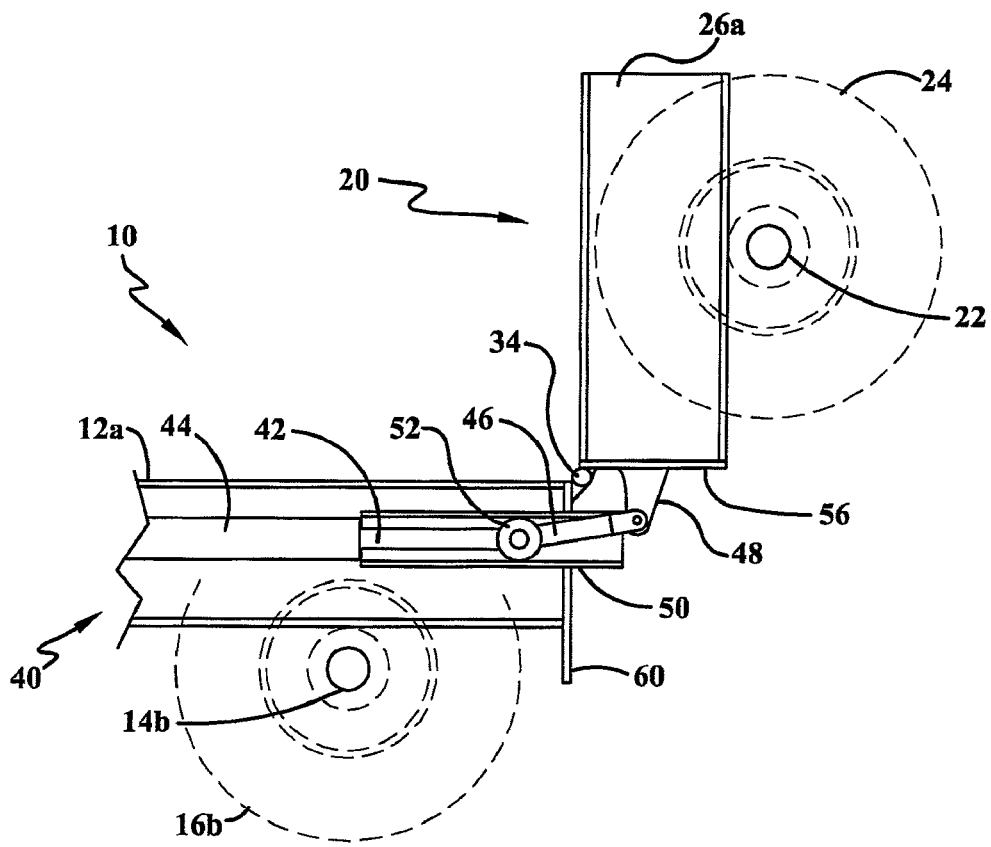
Figure 3C:
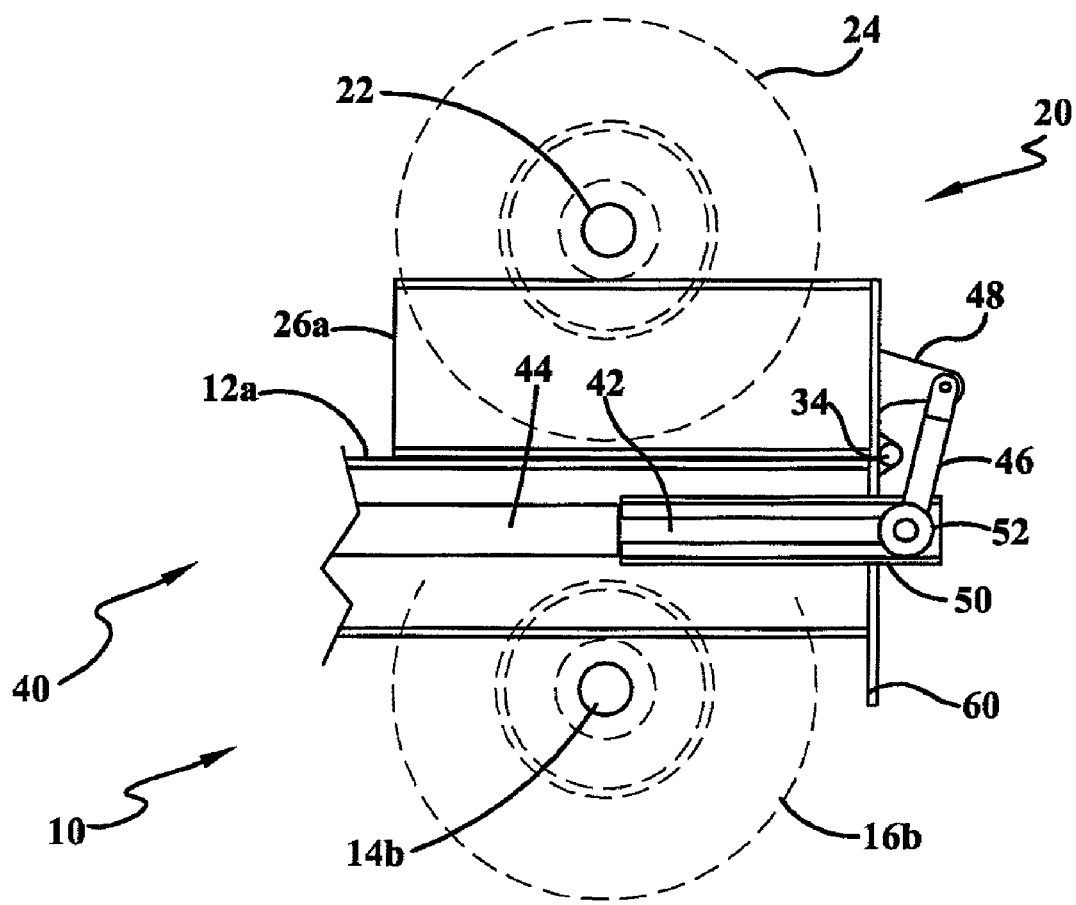

FIGS. 3A, 3B, and 3C are side sectional views showing the operation of the drive system in effecting displacement of the flip axle assembly, in accordance with the present invention.

Figure 4:
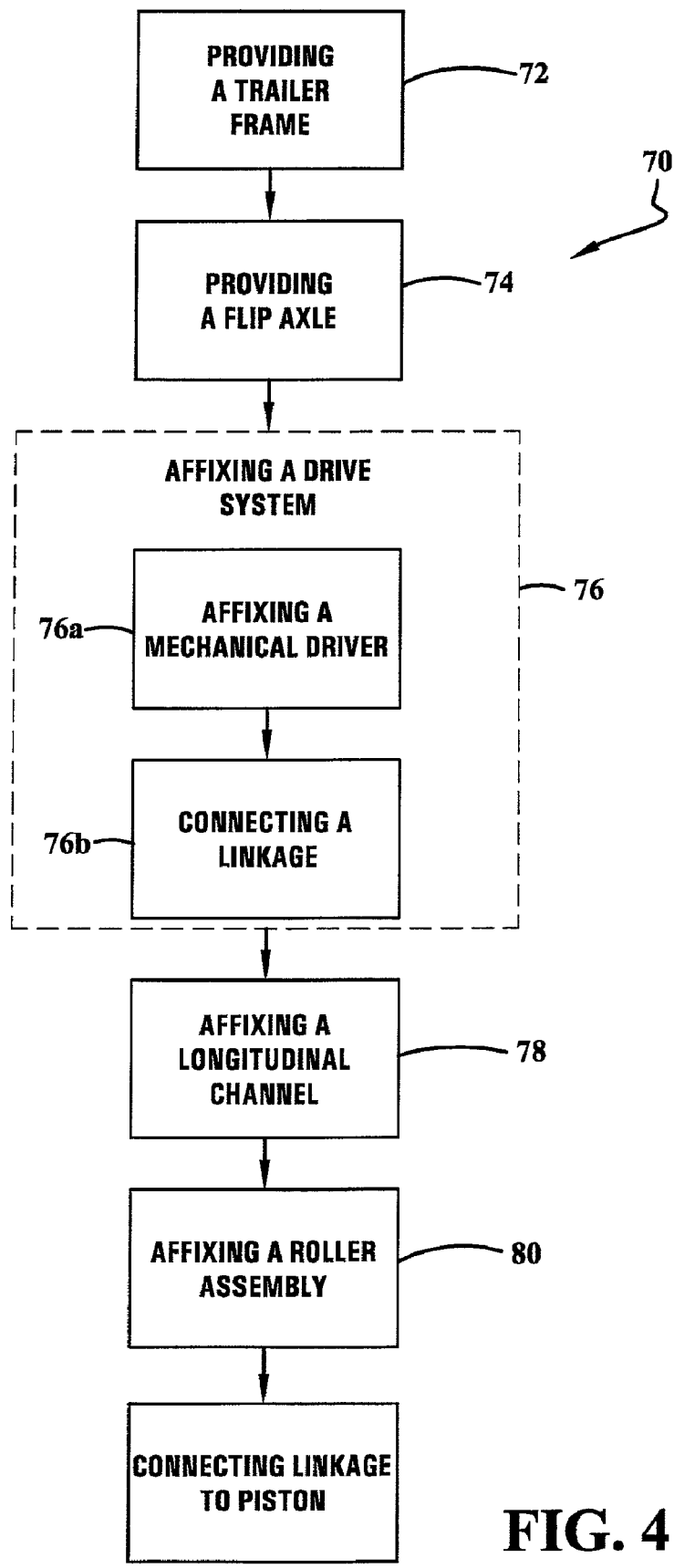

FIG. 4 is a flow chart depicting a method for making a trailer assembly with a flip axle assembly having a drive system, in accordance with the present invention.

IV. DETAILED DESCRIPTION OF THE INVENTION

The present invention generally relates to a trailer system having a drive system for rotationally displacing a flip axle, so that the flip axle may be rotated from a operational position, where the wheels of the flip axle engage the surface of the road, to a stowage position where the flip axle lies inverted on a rear deck of the trailer assembly.

Figure 1A:
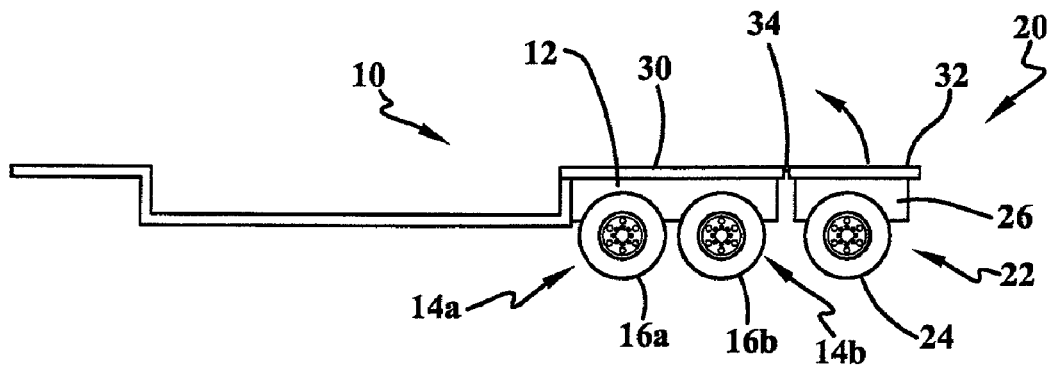
FIGS. 1A and 1B are side views generally depicting first and second operative positions of a trailer assembly having a flip axle displaced by a drive system in accordance with the present invention.
Figure 1B:
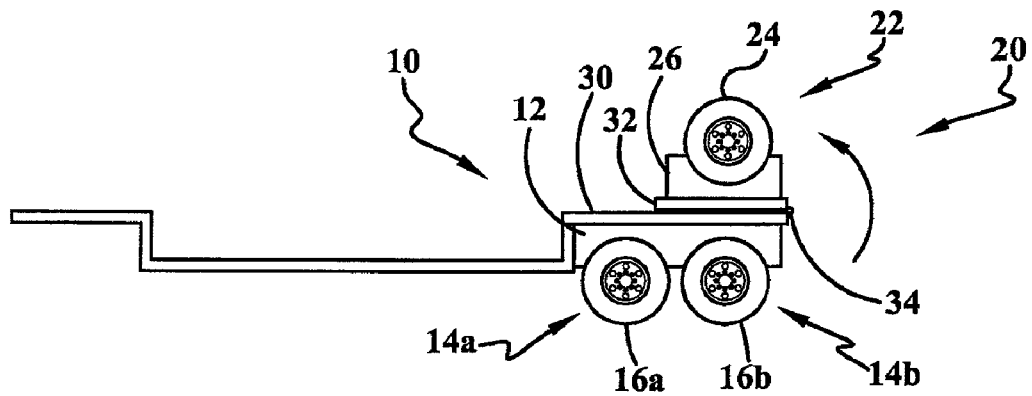

We refer now to the drawings wherein the showings are for purposes of illustrating embodiments of the invention only and not for purposes of limiting the same, and wherein like reference numerals are understood to refer to like components. FIGS. 1A and 1B generally show a trailer assembly 10 having a trailer frame 12 that supports a load to be carried. One or more axles 14a, 14b are provided, having laterally-spaced wheels 16a, 16b, and affixed to the trailer frame 12. The illustrated embodiment depicts a "lowboy" flatbed trailer of the type used to haul heavy equipment such as bulldozers and the like with a semi-tractor. However, it is to be understood that the invention is not limited in this way and could be suitably adapted for use with any type of trailer.

A flip axle assembly 20 is provided including one or more axles 22 having laterally-spaced wheels 24. The axles 22 are mounted onto a flip axle frame 26. The flip axle assembly 20 is hingeably mounted to the trailer frame 12, so as to be rotated from engagement with a road surface and onto the trailer frame 12. A drive system is provided that rotates the flip axle assembly 20 between the trailer frame 12 and engagement with the road surface, as will be set forth in greater detail hereinbelow.

Figure 2:
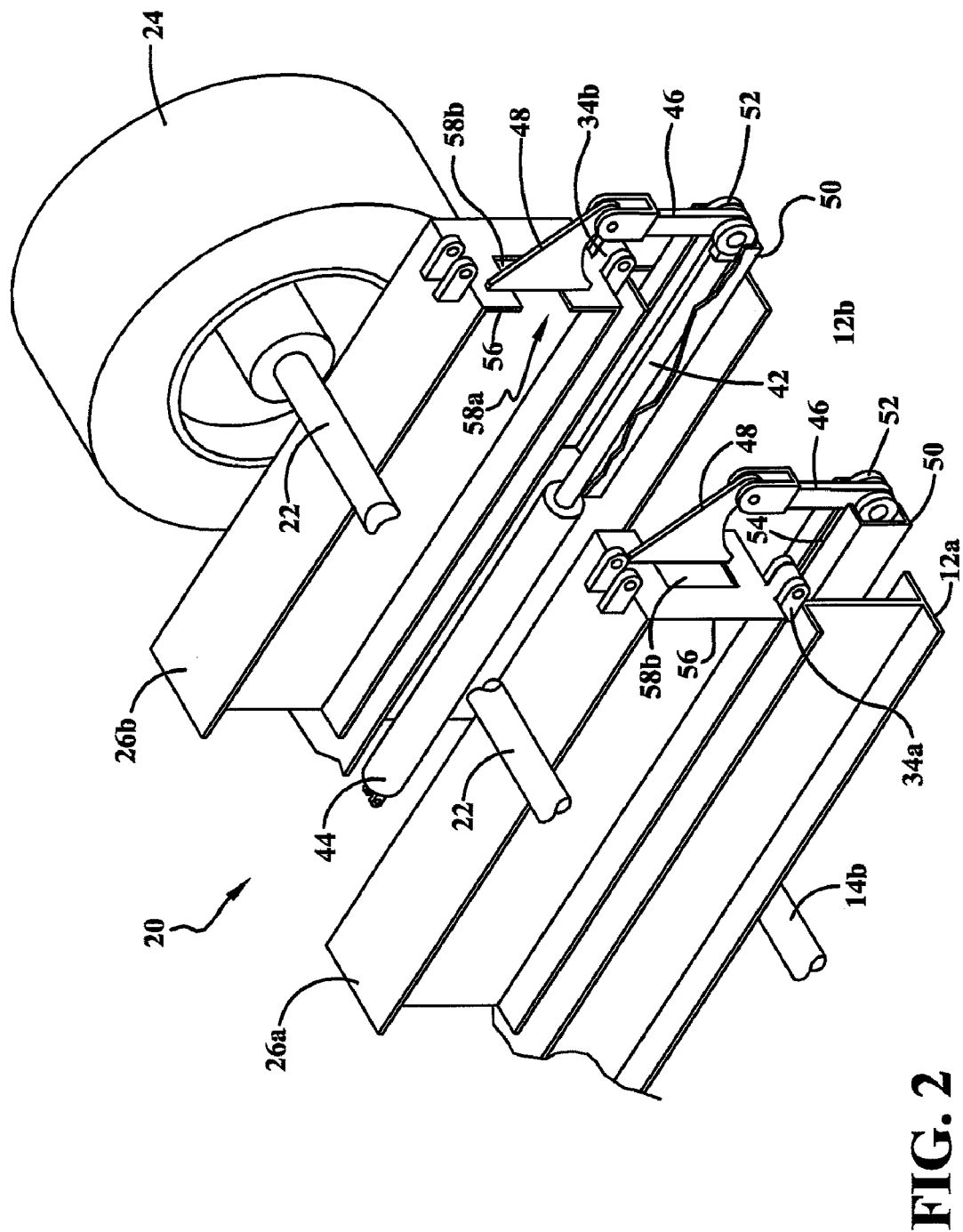
FIG. 2 is an oblique, partially sectional view illustrating a trailer frame with the flip axle assembly and having the drive system for effecting displacement of the flip axle assembly in accordance with the present invention.

As shown particularly in FIG. 2, the trailer frame 12 preferably includes first and second I-beams 12a, 12b that have the one or more axles 14a, 14b affixed thereto, so that the axles 14a, 14b span the distance between the two I-beams 12a, 12b, in the conventional manner typically practiced in the art. Similarly, the flip axle frame 26 also preferably includes a pair of I-beams 26a, 26b to which the one or axles 22 can be affixed. In the preferred embodiment, the I-beams 12a, 12b, 26a, 26b are conventional 16-inch×8-inch I-beams, having sufficient mechanical strength to support heavy loads.

As shown in FIG. 1, in the preferred embodiment, the trailer assembly 10 also includes a trailer rear deck 30 for supporting the flip axle assembly 20. A flip axle rear deck 32 is also provided. The rear decks 30, 32 can each be a plate of steel spanning the respective I-beams 12a, 12b, 26a, 26b thereby allowing heavy equipment to be driven off over the rear of the trailer assembly 10. The trailer frame 12 and flip axle frame 26 also each include support structures (not shown) that span the respective I-beams 12a, 12b, 26a, 26b and provide structural support to the trailer frame 12 and flip axle assembly 20, as is conventionally understood in the art.

In the illustrated embodiments, the trailer assembly 10 includes a first axle 14a and a second axle 14b each affixed to the trailer frame 12 and each having laterally-spaced wheels 16a, 16b. Also, the flip axle assembly 20 is illustrated as having a single axle 22 with respective wheels 24 affixed to the flip axle frame 26. It should be appreciated that the invention is not limited to the number of axles depicted and that both the trailer assembly 10 and the flip axle assembly 20 can be suitably configured to have any number of axles, without departing from the invention.

The flip axle assembly 20 is hingeably mounted to the trailer frame 12. A hinge arrangement 34 is provided to provide the hingeable connection. Any suitable type of hinge arrangement 34 could be implemented without departing from the invention. In the preferred embodiment, as shown particularly in FIG. 2, the flip axle assembly 20 includes a first hinge 34a and a second hinge 34b affixed to a top portion of the trailer frame 12, preferably mounted onto the top rear edges of the respective trailer frame I-beams 12a, 12b. The first and second hinges 34a, 34b are configured to allow 180 degrees of rotation, so as to allow the first axle assembly 20 to be rotated between an operative position where the wheels 24 engage a road surface, and a stowed position where the flip axle assembly 20 rests on the top of the trailer frame 12.

As generally indicated above and as illustrated in FIGS. 2, 3A, 3B, and 3C, a drive system 40 is provided that rotates the flip axle assembly 20 between the trailer frame 12 and engagement with the road surface. The drive system 40 can generally include any type of mechanical driver for applying a displacing force. The drive system 40 also includes a suitable linkage for transmitting the displacing force from the mechanical driver to rotate the flip axle assembly 20.

In the preferred embodiment, the drive system 40 includes a hydraulic system. However, it should be appreciated that any suitable mechanical system could also be used without departing from the invention. Such systems would include but not be limited to pneumatic systems or electromagnetically-driven elements, alone or in combination with any type of gear system, such as a worn drive or a rack and pinion assembly or the like, all without departing from the invention.

As shown in FIG. 2, the mechanical driver includes one or more hydraulic pistons that each cooperate with respective mechanical structures to effect displacement of the flip axle assembly 20. In the illustrated embodiments, a pair of hydraulic pistons is shown so as to apply an even rotational force to opposite ends of the flip axle assembly 20. The hydraulic piston 42 is driven by a hydraulic cylinder 44 in a reciprocating motion to apply a displacing force in a longitudinal direction parallel to the length of the trailer assembly 10. As illustrated, the hydraulic piston 42 is preferably supported within the respective I-beam 12b of the trailer frame 12 in a parallel alignment with the I-beam 12b. The hydraulic piston 42 therefore applies the displacing force outwardly through a rear portion of the trailer assembly 10, toward the flip axle assembly 20 at a place where the flip axle assembly 20 abuts the trailer assembly 10 when in the operative position.

The mechanical linkage includes a linkage member 46 pivotally mounted between an operative end of the hydraulic piston 42 and the flip axle assembly 20, so as to transmit the displacement force thereupon. The flip axle assembly 20 includes a movement hinge 48 for pivotally connecting to the linkage member 46 for transmitting the displacement force. The linkage member 46 preferably includes a U-shaped end that is connected to the movement hinge 48 through a common pin.

The drive system 40 also includes a longitudinal channel 50 coextensive with the hydraulic piston 42. The longitudinal channel 50 is parallel to the trailer frame 12, and is also preferably mounted with the respective I-beam 12b. The longitudinal channel 50 extends outwardly from the rear portion of the trailer assembly 10, where the trailer assembly 10 substantially abuts the flip axle assembly 20.

The operative end of the hydraulic piston 42 is affixed to a respective roller assembly 52 that rides within the longitudinal channel 50. The roller assembly 52 bears the weight of the flip axle assembly 20 by transmitting the weight to the longitudinal channel 50, thereby keeping the hydraulic piston 42 horizontal as it applies the displacing force. The roller assembly 52, the operative end of the piston 42, and the linkage 46 are pivotally mounted together with a common pin that fits transversely there through. The roller assembly 52 is preferably a pair of forklift bearings, mounted on opposite exterior ends of the commonly-mounted components, so as to contact the interior sides of the longitudinal channel 50.

The longitudinal channel 50 is preferably formed of a piece of square tubing having suitable interior dimensions to accommodate the roller assembly 52 along with the commonly connected operative end of the piston 42 and the linkage 46. The longitudinal channel 50 also includes a longitudinal slot 54, formed in the top and bottom portions of the longitudinal channel 50. The longitudinal slot 54 allows free pivotal motion of the linkage 46 as it is reciprocally driven back and forth by the action of the hydraulic piston 42. The slot 54 also accommodates the movable hinge 48 when the flip axle assembly 20 is in the operative position contacting the road surface, as will be explained in greater detail hereinbelow.

As noted hereinabove, and as illustrated in FIG. 2, the hydraulic piston 42 is one of a pair of hydraulic pistons 42 disposed so as to apply an even, symmetrical rotational force to opposite ends of the flip axle assembly 20. It is to be appreciated that the commonly numbered components indicated in FIG. 2 refer to similar opposing components. In this preferred embodiment, first and second hydraulic pistons 42 extend through respective first and second longitudinal channels 50, mounted substantially at opposite sides of the rear position of the trailer assembly 10. The operative ends of the first and second hydraulic pistons 42 comprise respective first and second roller assemblies 52 that ride within the respective longitudinal channels 50 and engage respective first and second linkages 46.

The I-beams 26a, 26b of the flip axle assembly 20 include end plates 56 that support the respective movable hinges 48. These end plates 56 each include an interior aperture 58a and an exterior aperture 58b that are sized and positioned so as to fit over the respective ends of the longitudinal channels 50 and around the longitudinal slots 54 when the flip axle assembly 20 is in the operative position in contact with the road surface. The longitudinal slots 54 are configured to receive the linkage 56 and the mounting hinges 48 when the flip axle assembly 20 is in the operative position.

In the preferred embodiment, the hydraulic cylinder 44 is driven by a hydraulic system that can be electrically or hydraulically powered by the motor of the semi-tractor. Alternatively, the hydraulic system can be driven by a separate on-board power supply, or by an external hydraulic connection at a loading dock or other facility where the flip axle assembly 20 may be raised and lowered. The hydraulic system preferably delivers 3000 psi to the hydraulic cylinder 44 and drives the piston 42 over a 30 inch stroke, and the two pistons 42 together deliver 60,000 ft.lbs. of torque to rotate the flip axle assembly 20 between the operative position and the stowed position.

FIGS. 3A, 3B, and 3C depict the action of the drive system 40 in displacing the flip axle assembly 20. As shown in FIG. 3A, the trailer assembly 10 includes a trailer frame including an I-beam 12a for supporting one or more axles (only axle 14b shown) having respective wheels 16b (shown in phantom). The flip axle assembly 20 supports an axle 22 having wheels 24 (shown in phantom). The flip axle assembly 20 is in an operative position so that flip axle frame having a respective I-beam 26a is generally in a line with its respective trailer frame I-beam 12a such that the wheels 24 engage the road surface.

In the operative position, the drive system 40 is fully retracted. The hydraulic piston 42 is substantially withdrawn within the hydraulic cylinder 44. The roller assembly 52 is substantially proximate to the hydraulic cylinder 44 and the linkage 46 is retracted within the longitudinal channel 50. The longitudinal channel 50 is extended through the interior and exterior apertures 58a, 58b of the end plates 56 on the flip axle assembly 20.

It should be noted that a rear portion 60 is provided at the end of the trailer assembly 10. The rear portion 60 is a flat metal plate spanning the respective I-beams 12a, 12b. The longitudinal channel 50 protrudes from the end of the rear portion 60 to be received within the interior and exterior apertures 58a, 58b. The rear portion 60 substantially abuts the end plates 56 of the flip axle assembly 20 when in the operative position. The movable hinge 48 fits within the longitudinal slot 54 so as to be nested within the longitudinal channel 50 when in the operative position.

In operation of the drive system 40, as shown in FIG. 3B, the drive system 40 is partially extended as the flip axle assembly 20 pivots along its hinges 34. The hydraulic piston 42 extends from the hydraulic cylinder 44. The roller assembly 52 is displaced within the longitudinal channel 50 from the hydraulic cylinder 44 and the linkage 46 protrudes from the end of the longitudinal channel 50. The movable hinge 48 moves clear of the longitudinal slot 54 and the interior and exterior apertures 58a, 58b are moved clear from the ends of the longitudinal channel as the flip axle assembly 20 is rotated away from abutment with the trailer assembly 10.

FIG. 3B shows the drive system 40 fully extended. The hydraulic piston 42 is at its maximum stroke from the hydraulic cylinder 44. The roller assembly 52 is displaced toward the end of the longitudinal channel 50. The linkage 46 is fully extended from the longitudinal channel and pivoted with respect to the piston 42 and the movable hinge 48. The flip axle assembly 20 is fully rotated onto the top of the trailer frame into the stowed position. The flip axle assembly 20 is moved again to the operative position where the wheels 24 contact the road surface by retracting the piston 42 and reversing the process of FIGS. 3A, 3B, and 3C.

FIG. 4 is a flow chart depicting a method 70 of constructing a mechanically-driven flip axle assembly in accordance with the present invention. It is to be appreciated that this method could be implemented in the manufacture of a new trailer assembly, or it can alternatively be implemented in a retrofitting operation performed on an existing trailer assembly, all without departing from the invention.

A step 72 is performed of providing a trailer frame having one or more axles that each support laterally-spaced wheels such that the axles are affixed to the trailer frame. The step 72 of providing a trailer frame can be performed by fabricating a new trailer frame in a manufacturing operation or by providing an existing trailer already in use.

A step 74 is performed of providing a flip axle assembly hingeably mounted to the trailer frame. The flip axle is provided so as to be rotated from engagement with a road surface onto the trailer frame. The flip axle assembly has one or more axles that support laterally-spaced wheels. The step 74 of providing a flip axle assembly can be performed during the manufacture of a new trailer frame or by providing an existing trailer already in use having a flip axle assembly. Alternatively, this step 74 can be performed by retrofitting an existing trailer already in use with a flip axle assembly, where one had not previously been installed.

A step 76 is performed of affixing a drive system to the trailer frame, so that the drive system rotates the flip axle assembly between the trailer frame and engagement with the road surface. This step 76 can include a substep 76a of affixing a mechanical driver to the trailer frame, so as to generate a displacing force. The step 76 can also include a substep 76b of connecting a linkage to the mechanical driver for transmitting the displacing force to the flip axle assembly, to produce rotation of the flip axle assembly.

The substep 76a of affixing a mechanical driver can include affixing one or more hydraulic pistons to the trailer frame. The substep 76b of connecting a linkage can include pivotally connecting a first end of a respective linkage member to an operative end of the hydraulic piston and pivotally connecting a second end of the linkage member to the flip axle assembly. In this way, the displacing force produced by the hydraulic piston is transmitted through the linkage member to the flip axle assembly, so as to produce rotation of the flip axle assembly.

Further additional steps are performed so as to construct a mechanically-driven flip axle assembly. A step 78 is performed of affixing a respective longitudinal channel to the trailer frame for each mechanical driver element. The longitudinal channel is affixed parallel to and extending outwardly from the trailer frame, and coextensive with the respective hydraulic piston.

A step 80 is performed of affixing a respective roller assembly to the operative end of the hydraulic piston, so that the roller assembly rides within the longitudinal channel. Another step 82 is performed of pivotally connecting the linkage member to the operative end of the hydraulic piston substantially proximate to the roller assembly. In this manner, a mechanical drive system is provided for rotationally displacing a flip axle on a new or existing trailer assembly.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

Having thus described the invention, it is now claimed:

1. A trailer assembly comprising:
   a trailer frame that supports a load to be carried;
   at least one axle having laterally-spaced wheels and affixed to the trailer frame;
   a flip axle assembly including at least one axle having laterally-spaced wheels, the flip axle assembly being hingeably mounted to the trailer frame, so as to be rotated from engagement with a road surface and onto the trailer frame; and
   a drive system that rotates the flip axle assembly between a stowed position on the trailer frame and a deployed position wherein the flip axle assembly engages with the road surface, the drive system comprising a mechanical driver for applying a displacing force, and a linkage for transmitting the displacing force from the mechanical driver to rotate the flip axle assembly;
   wherein the mechanical driver comprises at least one hydraulic piston that applies the displacing force through a rear portion of the trailer assembly, wherein the linkage comprises at least one linkage member pivotally mounted between an operative end of the at least one hydraulic piston and the flip axle assembly to transmit the displacement force thereupon;
   wherein the drive system comprises at least one longitudinal channel coextensive with the at least one hydraulic piston, the longitudinal channel being parallel to the trailer frame, and extending outwardly from the rear portion of the trailer assembly, wherein the operative end of the at least one hydraulic piston comprises a respective roller assembly that rides within the longitudinal channel.

2. The trailer assembly of claim 1, wherein the trailer frame comprises a rear deck for supporting the flip axle assembly.

3. The trailer assembly of claim 1, wherein the at least one axle comprises a first axle and a second axle each affixed to the trailer frame and each having laterally-spaced wheels.

4. The trailer assembly of claim 1, wherein the flip axle assembly comprises a single axle affixed to a flip axle frame.

5. The trailer assembly of claim 1, wherein the flip axle assembly comprises a first hinge and a second hinge affixed to a top portion of the trailer frame.

6. The trailer assembly of claim 1, wherein the flip axle assembly comprises at least one movement hinge for pivotally connecting to the at least one linkage member.

7. The trailer assembly of claim 1, wherein the at least one longitudinal channel comprises a longitudinal slot that allows free pivotal motion of the at least one linkage.

8. The trailer assembly of claim 1, wherein the drive system comprises first and second hydraulic pistons that extend through respective first and second longitudinal channels, mounted substantially at opposite sides of the rear position of the trailer, the operative ends of the first and second hydraulic pistons comprise respective first and second roller assemblies that ride within the respective longitudinal channels and engage respective first and second linkages.

9. The trailer assembly of claim 1 wherein the respective roller assembly is a bearing.

10. A trailer assembly comprising:
    a trailer frame that supports a load to be carried;
    at least one axle having laterally-spaced wheels and affixed to the trailer frame;
    a flip axle assembly including at least one axle having laterally-spaced wheels, the flip axle assembly being hingeably mounted to the trailer frame, so as to be rotated from engagement with a road surface onto the trailer frame; and
    a drive system that rotates the flip axle assembly between a stowed position on the trailer frame and a deployed position wherein the flip axle assemble engages with the road surface, the drive system comprising:
       at least one hydraulic piston that applies a displacing force;
       a linkage member pivotally mounted between an operative end of the at least one hydraulic piston and the flip axle assembly to transmit the displacing force from the at least one hydraulic piston to rotate the flip axle assembly; and
       a longitudinal channel coextensive with the at least one hydraulic piston, the longitudinal channel being parallel to the trailer frame, and extending outwardly from the rear portion of the trailer assembly, wherein the operative end of the at least one hydraulic piston comprises a respective roller assembly that rides within the longitudinal channel.

11. The trailer assembly of claim 10, wherein the flip axle comprises at least one movement hinge for pivotally connecting to the linkage member.

12. The trailer assembly of claim 10, wherein the longitudinal channel comprises a longitudinal slot that allows free pivotal motion of the linkage member.

13. The trailer assembly of claim 10, wherein the drive system comprises first and second hydraulic pistons that extend through respective first and second longitudinal channels, mounted substantially at opposite sides of the rear position of the trailer, the operative ends of the first and second hydraulic pistons comprise respective first and second roller assemblies that ride within the respective longitudinal channels and engage respective first and second linkages.

14. The trailer assembly of claim 10 wherein the respective roller assembly is a bearing.

15. A method of constructing a trailer assembly having a mechanically-driven flip axle assembly comprising:
    providing a trailer frame having at least one axle that supports laterally-spaced wheels and affixed to the trailer frame;
    providing a flip axle assembly hingeably mounted to the trailer frame, so as to be rotated from a deployed position wherein the flip axle assembly engages with a road surface to a stowed position on the trailer frame, the flip axle assembly having at least one axle that supports laterally-spaced wheels;
    affixing a drive system to the trailer frame, so that the drive system rotates the flip axle assembly between the trailer frame and engagement with the road surface;
    wherein affixing a drive system comprises:
       affixing a mechanical driver to the trailer frame, so as to generate a displacing force; and
       connecting a linkage to the mechanical driver for transmitting the displacing force to the flip axle assembly, to produce rotation of the flip axle assembly;
    affixing a respective longitudinal channel parallel to and extending outwardly from the trailer frame, and coextensive with the at least one hydraulic piston;
    affixing a respective roller assembly to the operative end of the hydraulic piston, so that the roller assembly rides within the longitudinal channel; and
    pivotally connecting the linkage member to the operative end of the hydraulic piston substantially proximate to the roller assembly.

16. The method of claim 15, wherein:
    the affixing a mechanical driver comprises affixing at least one hydraulic piston to the trailer frame; and wherein the connecting a linkage comprises pivotally connecting a first end of a respective linkage member to an operative end of the hydraulic piston and pivotally connecting a second end of the linkage member to the flip axle assembly, so that the displacing force produced by the hydraulic piston is transmitted through the linkage member to the flip axle assembly.

17. The trailer assembly of claim 15 wherein the respective roller assembly is a bearing.

18. A trailer assembly comprising:

a main trailer frame including a main deck member adapted to support a payload;

at least one axle having laterally-spaced wheels and affixed to the main trailer frame;

a flip axle assembly comprising an extended trailer frame including an extended deck member adapted to support a payload, the extended trailer frame further including at least one axle having laterally-spaced wheels, the axle being affixed to the extended trailer frame, the extended trailer frame being hingeably mounted to the main trailer frame and the extended trailer frame being adapted to rotate between a deployed position, wherein the wheels engage a road surface and a stowed position, wherein the extended deck substantially faces the main deck; and a drive system adapted to rotate the flip axle assembly between the deployed and stowed positions, the drive system comprising:

at least one hydraulic piston that applies a displacing force;

a linkage member pivotally mounted between an operative end of the at least one hydraulic piston and the flip axle assembly to transmit the displacing force from the at least one hydraulic piston to rotate the flip axle assembly; and at least one longitudinal channel coextensive with the at least one hydraulic piston, wherein the operative end of the at least one hydraulic piston comprises a device that travels within the longitudinal channel and maintains the at least one hydraulic piston substantially parallel to the longitudinal channel.

19. The trailer assembly of claim 18 wherein the longitudinal channel extends outwardly from the rear portion of the trailer assembly.

20. The trailer assembly of claim 18 wherein the longitudinal channel is substantially parallel to the trailer frame.

21. The trailer assembly of claim 18 wherein the device is a roller assembly.

22. The trailer assembly of claim 21 wherein the roller assembly is a bearing.

* * * * *